United States Patent
Reiling et al.

(10) Patent No.: US 11,036,188 B2
(45) Date of Patent: Jun. 15, 2021

(54) WEARABLE DEVICE WITH RF TRANSMITTER

(71) Applicant: Timex Group USA, Inc., Middlebury, CT (US)

(72) Inventors: Claudia Reiling, Pforzheim (DE);
Thomas Oberhofer, Pforzheim (DE);
Helmut Zachmann, Remchingen (DE);
Felix Poguntke, Karlsruhe (DE)

(73) Assignee: Timex Group USA, INC., Middlebuty, CT (US)

( * ) Notice: Subject to any disclaimer, the term of this patent is extended or adjusted under 35 U.S.C. 154(b) by 71 days.

(21) Appl. No.: 15/991,466

(22) Filed: May 29, 2018

(65) Prior Publication Data
US 2019/0369567 A1    Dec. 5, 2019

(51) Int. Cl.
| | |
|---|---|
| *G04G 21/04* | (2013.01) |
| *G04R 60/12* | (2013.01) |
| *G04B 37/00* | (2006.01) |
| *H01Q 1/27* | (2006.01) |
| *H01Q 9/04* | (2006.01) |
| *H04B 1/3827* | (2015.01) |

(52) U.S. Cl.
CPC ......... *G04G 21/04* (2013.01); *G04B 37/0008* (2013.01); *G04R 60/12* (2013.01); *H01Q 1/273* (2013.01); *H01Q 9/0407* (2013.01); *H04B 1/385* (2013.01)

(58) Field of Classification Search
CPC .... G04G 21/04; G04B 37/0008; G04R 60/12; H01Q 1/273; H01Q 9/0407; H04B 1/385

USPC ............... 368/281, 47; 343/718, 702, 720
See application file for complete search history.

(56) References Cited

U.S. PATENT DOCUMENTS

| | | | |
|---|---|---|---|
| 5,329,501 A | 7/1994 | Meister et al. | |
| 6,411,569 B1 | 6/2002 | Megner et al. | |
| 7,215,600 B1 | 5/2007 | DeRosa | |
| 7,433,273 B2 | 10/2008 | Oguchi et al. | |
| 7,639,569 B2 | 12/2009 | Yano et al. | |
| 7,701,806 B2 | 4/2010 | Oguchi et al. | |
| 9,989,923 B2 | 6/2018 | Kobayashi et al. | |
| 2004/0145975 A1 | 7/2004 | Barras et al. | |
| 2005/0195689 A1* | 9/2005 | Oguchi ................. | G04C 10/02 368/47 |
| 2010/0164818 A1* | 7/2010 | Kusunoki ............. | G04G 21/04 343/718 |

(Continued)

FOREIGN PATENT DOCUMENTS

WO      2018016574 A1      1/2018

*Primary Examiner* — Edwin A. Leon
(74) *Attorney, Agent, or Firm* — Carmody Torrance Sandak & Hennessey LLP

(57) ABSTRACT

A wristworn device having a conductive dial, the conductive dial having a top side and a bottom side; a conductive case body including a conductive case back; a circuit block, and an antenna operatively coupled to the circuit block, for receiving and transmitting RF signals, wherein at least the antenna is positioned on the bottom side of the conductive dial, and further wherein the antenna and circuit block are inside the conductive case body, wherein the conductive dial and the conductive case body are physically separated; and wherein spacing created between the conductive case body and the conductive dial permits RF signals to be transmitted from out of the wristworn device on the top side of the conductive dial.

14 Claims, 4 Drawing Sheets

(56) References Cited

U.S. PATENT DOCUMENTS

| | | | |
|---|---|---|---|
| 2011/0102274 A1* | 5/2011 | Fujisawa | H01Q 7/00 343/702 |
| 2012/0170423 A1* | 7/2012 | Fujisawa | G04C 10/02 368/10 |
| 2017/0038744 A1 | 2/2017 | Fujisawa | |

* cited by examiner

WEARABLE DEVICE WITH RF TRANSMITTER

BACKGROUND OF THE INVENTION

The present invention is directed to wearable electronic devices generally, and in particular, to a wearable electronic device that comprises an antenna for receiving and transmitting RF signals, further comprising a conductive dial and a conductive case body, and in particular, to such a wearable device that provides for improved RF signal range for the antenna.

Designers are well aware of the complexity of obtaining a desirable radio frequency (i.e. RF) range for electronic devices that include a conductive case body. Such devices include mobile phones and/or wearable electronic devices, such as wristworn devices. Typically, known methods and constructions that provide a suitable RF range require the need to include separation strips of plastic to create a gap in the metal case body. Such strips or other plastic parts need to be incorporated into the designing of the device at the design and construction stage. A good example of the state of the art may be found in U.S. Pat. No. 7,215,600, which is owned by the present assignee.

Other known designs use a non-metallic dial with a metal case. For example, in U.S. Pat. No. 6,411,569 there are a plurality of non-conductive members intermediate the casing and non-metal dial to permit a signaling path out of the device through a non-conductive member, such as through ring 14. In addition, U.S. Pat. No. 6,411,569 describes the use of a ceramic or glass caseback, which would also allow for the effective passing of signals therethrough. Based thereon, it can be see that there would be several paths by which signals could escape, but only through non-conductive materials. Moreover, U.S. Pat. No. 6,411,569 does not describe being applicable to the transmission of RF signals. Similarly, U.S. Pat. No. 7,639,569 describes the use of non-conductive spacers generally, and also does not describe the ability to transmit RF signals. Further, an example whereby the casing itself is utilized to assist in "locking down" the dial is described in U.S. Pat. No. 7,701,806.

Based thereon, additional improvements are desirable. For example, it would be desirable to significantly improve the RF range of a wearable device in the transmission and receipt of RF signals where a conductive (e.g. metal) dial and a conductive (e.g. metal and/or stainless steel) case body is used, without the need for additional and/or complicated elements and parts and without need for customizable designs for each implementation. For example, it is desirable to develop a construction that eliminates the need to adapt the design to "hide" components which are not initially foreseen in the design. Another desire is to minimize the number of component parts needed to achieve significant improvement in the RF range of transmission and receipt of RF signals where a conductive dial and conductive case body is utilized, thus simplifying the construction of the device itself.

It is thus believed that further advances to the state of the art are both desirable and achievable, all of which are provided by the embodiments disclosed herein.

SUMMARY AND OBJECTIVES OF THE INVENTION

It is thus an objective of the present invention to overcome the perceived deficiencies in the prior art.

Specifically, it is an objective of the present invention to provide a wearable electronic device that provides an improved RF range while minimizing the number of needed components/parts therefor.

It is another objective of the present invention to provide a wearable electronic device that provides for an improved RF range while using conventional components, thereby eliminating the need to redesign the construction of such devices or redesigning the components needed therefor.

Still another objective of the present invention is to provide a wearable device that provides an improved transmission and receipt range of RF signals where a conductive (e.g. metal) dial and a conductive (e.g. metal and/or stainless steel) case body is used, without the need for additional and/or complicated elements and parts and without the need for customizable designs.

Further objects and advantages of this invention will become more apparent from a consideration of the drawings and ensuing description.

The invention accordingly comprises the features of construction, combination of elements, and arrangement of parts which will be exemplified in the construction, illustration and description hereinafter set forth, and the scope of the invention will be indicated in the claims.

Therefore, to overcome the perceived deficiencies in the prior art and to achieve the objects and advantages set forth above and below, a preferred embodiment of the present invention is, generally speaking, directed to a wristworn device comprising a conductive dial, the conductive dial having a top side and a bottom side; a conductive case body including a conductive case back, a circuit block, and an antenna operatively coupled to the circuit block, for receiving and transmitting RF signals, wherein at least the antenna is positioned on the bottom side of the conductive dial, and further wherein the antenna and circuit block are inside the conductive case body, wherein the conductive dial and the conductive case body are physically separated; and wherein spacing created between the conductive case body and the conductive dial permits RF signals to be transmitted from out of the wristworn device on the top side of the conductive dial.

In a preferred embodiment, the electronic device is a timepiece in the form of a wristwatch, although other wearable devices other than only a timepiece can be provided with the functionality set forth herein and thus equally provide the above and hereinafter mentioned advantages and benefits.

BRIEF DESCRIPTION OF THE DRAWINGS

The above set forth and other features of the invention are made more apparent in the ensuing Description of the Preferred Embodiments when read in conjunction with the attached Drawings, wherein:

FIG. 1 illustrates a perspective view of a wearable electronic device constructed in accordance with all the preferred embodiments of the present invention, while

Identical reference numerals in the figures are intended to indicate like parts, although not every feature in every figure may be called out with a reference numeral.

DETAILED DESCRIPTION OF THE PREFERRED EMBODIMENTS

Reference is thus made to FIGS. 1, 1A, 2 and 2A, which illustrate a wearable electronic device, generally indicated at 10 and 10', constructed in accordance with preferred embodiments of the present invention.

Reference is thus made to electronic devices 10, 10' which are preferably a wristwatch having a round-shaped case body, generally indicated at 20. Case body 20 is preferably made of a conductive material, such as metal and/or stainless steel. Suitable embodiments of electronic devices that can take advantage of the present invention are disclosed in U.S. Pat. No. 7,113,450, the subject matter of which is entirely incorporated by reference, as if fully set forth herein.

Figure 1:
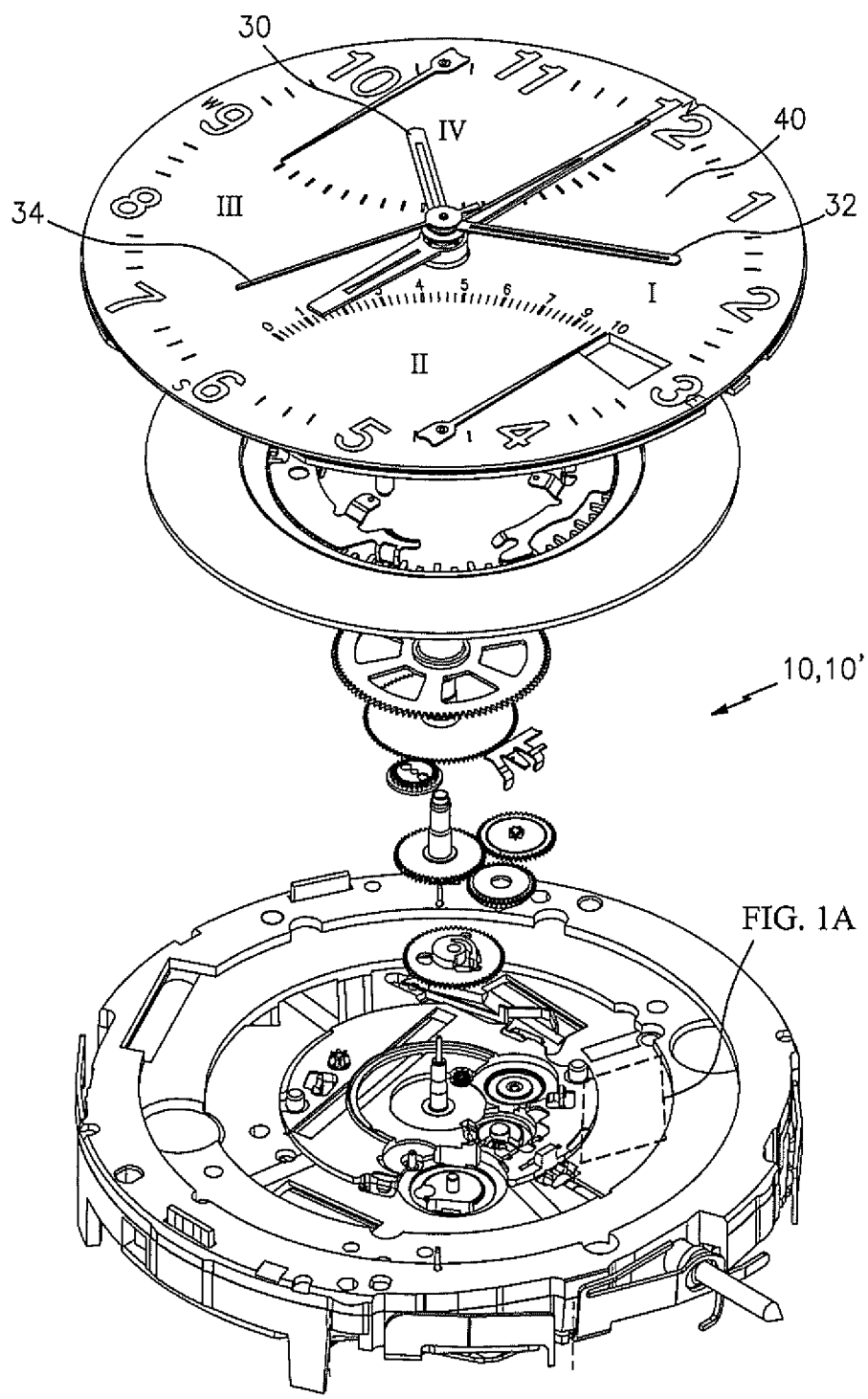
Figure 1A:
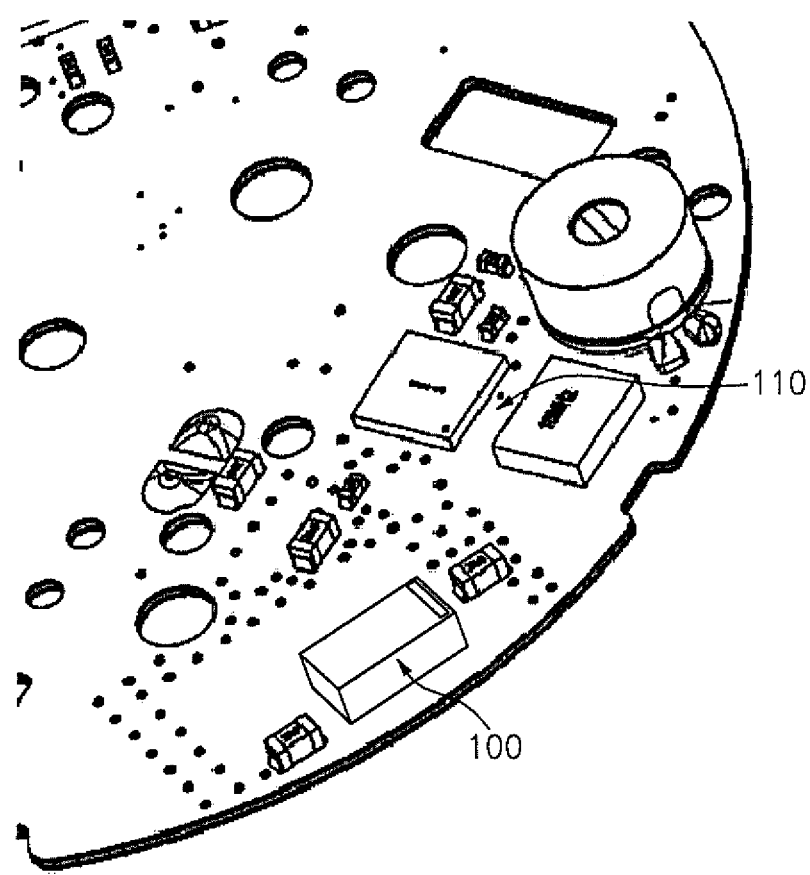
FIG. 1A shows an enlarged section of a printed circuit board on which an antenna and a circuit block, as disclosed herein, are supported.

Case body 20 houses the gears and one or more motors (e.g. step motors, MEMS, etc.) to drive the one or more hands (e.g. hour, minute and/or seconds hands, among others) as would be understood in the art. FIG. 1 is an electronic device that may include all the features disclosed and/or claimed herein, including but not limited to a stem on which an exemplary set of hands (e.g. hour, minute and seconds) are rotatably mounted.

A time display is provided and is comprised of a conductive dial 40, such as metal, with a time display surface on which surface indicia 42 may be provided by way of inking, painting press-on, etching, engraving or other means, all of which are well known in the art. As would also be well understood in the art, the hour, minute and/or second hands (and/or other indicators as the case may be) are driven by the motors via the one or more gears and point to positions on dial 40 to convey time and/or other information.

Dial 40 has a display surface that faces the outside so that it can be read externally through a crystal (e.g. glass or plastic) cover 45 that seals the top part of the case body. A sealing ring 47 may be provided to assist in waterproofing wearable electronic device 10.

Between the dial 40 and the case back 21 of case body 20 (i.e. inside the case) are disposed a movement, generally indicated at 70, with a timekeeping function, a battery 72 for supplying power to the movement 70, and an antenna 100 for receiving and transmitting RF signals from and to, respectively, respective external transmitting and receiving devices, such as a cellphone, just to name one example of many. Movement 70 preferably has a quartz oscillator unit including a quartz oscillator, a circuit block as a control unit (e.g. timekeeping control unit) with a control function, one or more stepping motors as drivers for turning the hands 30, 32, 34, one or more gear trains for transferring drive power from the one or more stepping motors to the hands 30, 32, 34, and other features and components to provide the functionality, hold the movement in place and otherwise allow wearable electronic device 10, 10' to operate as a functioning device, such a timepiece as but one example and as well understood in the art.

Antenna 100 is preferably a chip antenna, but is not limited thereto.

A circuit block, generally indicated at 110, is provided and comprises a reception circuit for processing RF signals received by antenna 100 and a transmission circuit for transmitting RF signals via antenna 100 to external devices, e.g. a cellphone. The RF range for which the present invention is highly advantageous is 20 kHz to 300 GHz, and a preferred frequency range is between about 2.402 GHz to 2.483 GHz (e.g. the Bluetooth frequency band). The construction of suitable reception and transmission circuits are well within the purview of one skilled in the art. However to ensure completeness, a suitable design thereof is disclosed in US Publication No. 2004/0145975, the entire subject matter of which is incorporated as if fully set forth herein.

In the preferred embodiments, the antenna 100 and the circuit block 110 are both provided on the bottom side of the dial. That is, the dial is disclosed as having a top side and a bottom side. For reference purposes, it should be understood that cover 45 is on the top side of the dial while the case back 21 for example, is on the bottom side of the dial. Being "on" the top or bottom side is not meant to require that such elements are adhered to, stuck on, and/or are mounted on the dial itself. The figures make this understanding abundantly clear.

In accordance with a first embodiment of the present invention, a non-conductive separating element 120 is positioned intermediate the conductive case body 20 and conductive dial 40, for physically separating the conductive case body 20 and the conductive dial 40 in the vertical direction. A further non-conductive separating element 130, preferably in the shape of a ring, may be provided for further separating the conductive case body 20 and the conductive dial 40 in the lateral direction. Separating element 120 and non-conductive separating element 130 may be separate components or a unitary member, as desired.

Figure 2A:
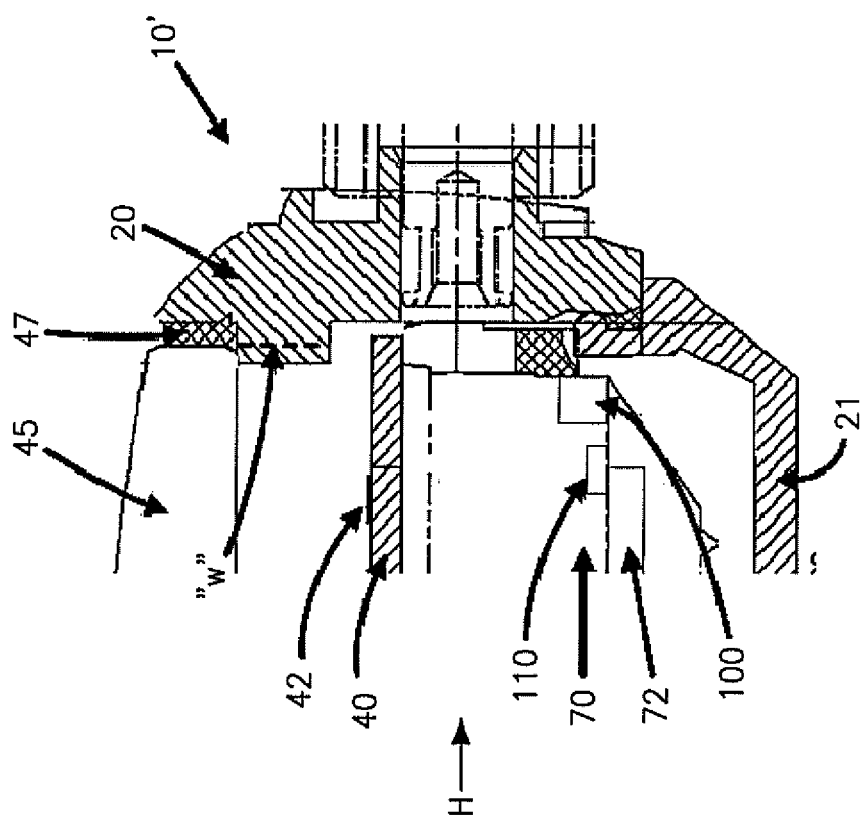
FIG. 2A illustrates the wearable electronic device in accordance with an alternative preferred embodiment of the present invention, shown in partial cross-section.

In an alternative arrangement of device 10' as illustrated in FIG. 2A, the vertical and/or horizontal separation between the conductive case body 20 and the conductive dial 40 may be provided by an air-gap(s) (e.g. just separating the components apart without any use of elements 120 or 130). It should be understood that a combination of separating element(s) 120 and/or 130 along with either of the separation being achieved by an air gap may also be utilized.

In accordance with the present invention, it has been discovered through experimentation that the vertical and/or lateral spacing created between the conductive case body 20 and the conductive dial 40 in a wearable electronic device as disclosed herein provides for the transmission of RF signals for up to about ten (10) meters.

Figure 2:
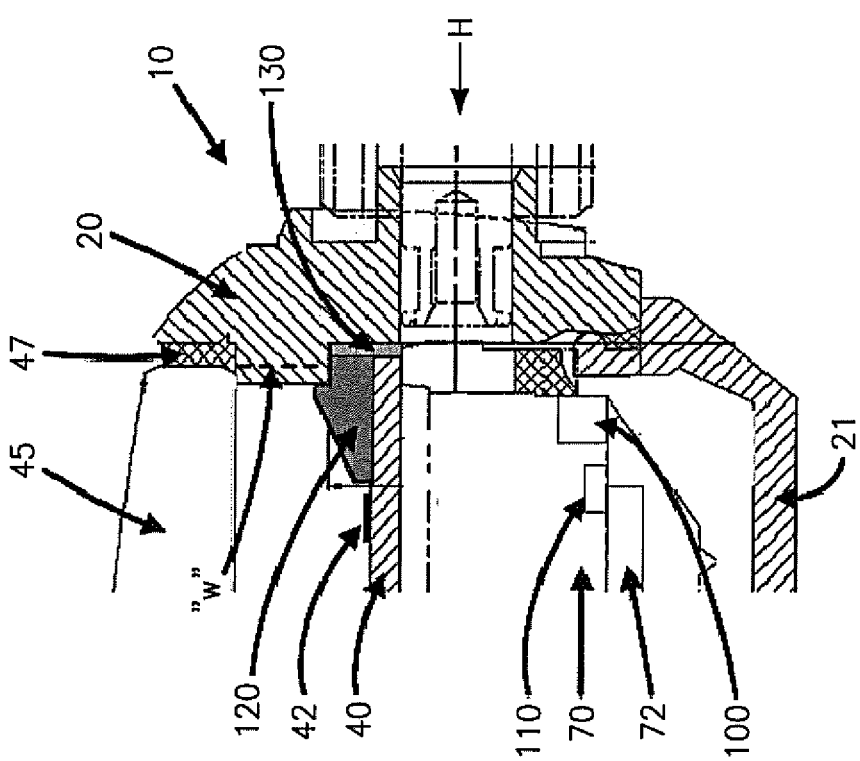
FIG. 2 illustrates the wearable electronic device in accordance with a first preferred embodiment of the present invention, shown in partial cross-section.
Figure 3:
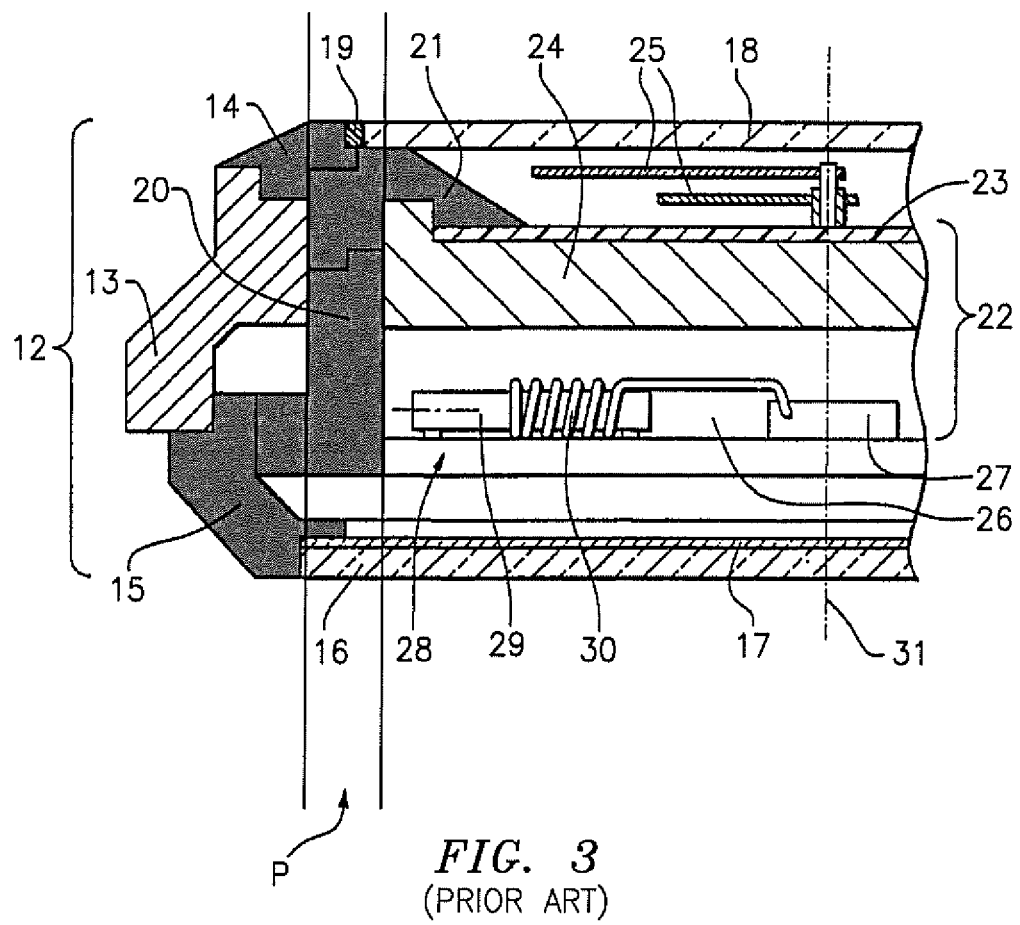
FIG. 3 illustrates an embodiment in accordance with the prior art, highlighting a feature of the present invention by contrasting it with the cited prior art.

As discussed above, there an absence in the prior art of any description or suggestion of utilizing a conductive dial (e.g. metal) in combination with a conductive (e.g. metal or stainless steel) case body that can effectively transmit RF signals. Moreover, it thus follows that there is nothing in the prior art that describes, teaches or suggests a construction in which a conventional conductive (e.g. metal or stainless steel) case body 40 can be used with a conventional conductive (e.g. metal) dial 40 in which the case body 20, has been already designed such that it overlies a portion of the conductive dial 40. More specifically, as illustrated in FIGS. 2 and 2A, it can be seen that a section of case body 20 of width "w" extends over and overlies the outer edge of dial 40. For example, the construction of the present invention may be contrasted with the design in U.S. Pat. No. 6,411,569 as illustrated in FIG. 3, wherein there is no section of the case body 13 that overlies the dial 23, as illustrated by the nonconductive vertical linear path "P" through the entire watchcase.

Said a different way, it can be seen in FIGS. 2 and 2A that a portion of the conductive case body 20 that is on the top side of the conductive dial overlies the conductive dial, taken from a perspective of (i) the conductive dial being in a horizontal ("H") orientation; and (ii) the conductive dial 40 being intermediate the portion of the conductive case body 20 that overlies the conductive dial 40 and the case back 21.

It can thus be seen that the present invention provides for an improved wearable electronic device that provides an improved RF range while minimizing the number of needed components/parts therefor. It can also be seen that the present invention provides a wearable electronic device that provides for an improved RF range while using conventional components, thereby eliminating the need to redesign the construction of such devices or redesigning the components needed therefor.

That is, while most prior art designs use dial/case configurations to hold/fix the movement inside the case and thus in no way suggests modifying this area to improve the RF range by making use of the reflection behavior of the RF waves inside the case, the present invention in patentable contrast makes use of the reflection behavior (reflection, diffusion and ray bending) of the RF waves inside the case body 20, the opening of the RF shielding by means of the non-conductive elements 120, 130 or the aforementioned air gap(s) with no or less RF damping, and/or provides for the direction of the radiation/beam, which is not damped by the human body by a path using the caseback, which in the present embodiment is preferably metal or stainless steel in any event.

As alluded to above, the present invention is applicable for the wide range of displays and functionality. For at least this reason, the subject matter of coowned U.S. Pat. No. 7,113,450, which discloses a wide variety of devices and applications to which the present invention is applicable, is incorporated by reference as if fully set forth herein. For example, the electronic device of the present invention may provide for the receipt and/or transmission of signals comprising one or more of satellite data, GPS data, phone data, and other sensory data that may be received and/or transmitted by device 10, whether it be fitness data, weather data, interactive game data, speed/distance, phone messages, incoming call information including the calling party, reminders, etc.

It should also be understood that reference to the antenna and circuit block being "inside the conductive case body" means inside the cavity of the case body 20, not inside the metal itself, but this too should be well understood but is confirmed here out of an abundance of caution. It should also be understood that the RF signal path out of the wristworn device on the top side of the conductive dial is intended to mean that the RF signals exit the device e.g. proximate the cover 45, which is on the top side of the dial 40. Lastly, "physical separation" (and the like) means that the features are not directly connected, e.g. are physically separated by an element 120 and/or 130 or by an air gap therebetween. For example, in the vertical direction (i.e. perpendicular to the aforementioned "H" direction), the conductive dial 40 and the conductive case body 20 are physically separated by at least 100 microns. And finally, as should now be understood, the present invention is highly advantageous for use in combination with a transceiver physically separated from the wristworn device 10, 10', which thus may be a cellphone or the like.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It should also be understood that the following claims are intended to cover all of the generic and specific features of the invention described herein and all statements of the scope of the invention that as a matter of language might fall therebetween.

The present invention is also applicable to a wide variety of devices and applications. That is, while the embodiments disclosed herein have been disclosed with reference to quartz analog timepieces and wristwatches in particular, the scope of the invention is not so limiting.

What is claimed is:

1. A wristworn device comprising:
    a conductive dial, the conductive dial having a top side and a bottom side;
    a conductive case body including a conductive case back;
    a circuit block, and an antenna operatively coupled to the circuit block, for receiving and transmitting RF signals, wherein at least the antenna is positioned on the bottom side of the conductive dial, and further wherein the antenna and circuit block are inside the conductive case body,
    wherein the conductive dial and the conductive case body are physically separated all the way around the perimeter of the conductive dial; and
    wherein spacing created between the conductive case body and the conductive dial permits RF signals to be transmitted from out of the wristworn device on the top side of the conductive dial; and
    wherein a portion of the conductive case body that is on the top side of the conductive dial overlies the conductive dial, taken from a perspective of:
        the conductive dial being in a horizontal orientation; and
        the conductive dial being intermediate the portion of the conductive case body that overlies the conductive dial and the case back.

2. The wristworn device as claimed in claim 1, comprising a non-conductive separating element, positioned intermediate the conductive dial and the conductive case body, for physically separating the conductive case body and the conductive dial.

3. The wristworn device as claimed in claim 1, wherein the conductive dial and the conductive case body are physically separated by an air gap.

4. The wristworn device as claimed in claim 1, wherein the antenna and the circuit block are positioned intermediate the case back and the bottom side of the dial.

5. The wristworn device as claimed in claim 1, comprising a non-conductive separating element positioned intermediate the conductive dial and the conductive case body in the lateral direction between an edge of the conductive dial and a surface of the conductive case body.

6. The wristworn device as claimed in claim 1, wherein the conductive dial is a metal dial.

7. The wristworn device as claimed in claim 1, wherein the conductive case body is a metal case body.

8. The wristworn device as claimed in claim 1, wherein the conductive case body is a stainless steel case body.

9. The wristworn device as claimed in claim 1, wherein the non-conductive separating element is a non-metallic spacer.

10. The wristworn device as claimed in claim 1, wherein the non-conductive separating element is a non-metallic reflector ring.

11. The wristworn device as claimed in claim 1, wherein the conductive dial and the conductive case body are physically separated by at least 100 microns.

12. A wristworn device comprising:
- a conductive dial, the conductive dial having a top side and a bottom side;
- a conductive case body including a conductive case back,
- a circuit block, and an antenna operatively coupled to the circuit block, for receiving RF signals from and transmitting RF signals to a transceiver physically separated from the wristworn device, wherein at least the antenna is positioned on the bottom side of the conductive dial, and further wherein the antenna and circuit block are inside the conductive case body,
- wherein the conductive dial and the conductive case body are physically separated all the way around the perimeter of the conductive dial; and
- wherein spacing created between the conductive case body and the conductive dial permits RF signals to be transmitted from out of the wristworn device on the top side of the conductive dial; and
- wherein a portion of the conductive case body that is on the top side of the conductive dial overlies the conductive dial, taken from a perspective of:
  - the conductive dial being in a horizontal orientation; and
  - the conductive dial being intermediate the portion of the conductive case body that overlies the conductive dial and the case back.

13. The wristworn device as claimed in claim 12, comprising a non-conductive separating element, positioned intermediate the conductive dial and the conductive case body, for physically separating the conductive case body and the conductive dial.

14. The wristworn device as claimed in claim 12, wherein the conductive dial and the conductive case body are physically separated by an air gap.

* * * * *